US006876229B1

(12) United States Patent
Barus et al.

(10) Patent No.: US 6,876,229 B1
(45) Date of Patent: Apr. 5, 2005

(54) METHOD AND SYSTEM FOR PROVIDING BIDIRECTIONAL ASYNCHRONOUS COMMUNICATION

(75) Inventors: Daniel J. Barus, Glenham, NY (US); Jeffrey R. Biamonte, Hyde Park, NY (US); Raymond J. Harrington, Staatsburg, NY (US); Timothy M. Trifilo, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/668,488

(22) Filed: Sep. 23, 2003

(51) Int. Cl.[7] .......................................... H03K 19/0175
(52) U.S. Cl. ............................ 326/82; 326/26; 326/93
(58) Field of Search ............................ 326/26, 27, 30, 326/37, 38, 46, 82, 83, 93–98

(56) References Cited

U.S. PATENT DOCUMENTS

| 4,859,877 | A | * | 8/1989 | Cooperman et al. ........... 326/30 |
| 5,384,808 | A | * | 1/1995 | Van Brunt et al. .......... 375/257 |
| 5,428,800 | A | * | 6/1995 | Hsieh et al. ................... 326/82 |
| 5,767,701 | A | * | 6/1998 | Choy et al. .................... 326/93 |
| 6,452,421 | B2 | * | 9/2002 | Saito ............................. 326/93 |
| 6,462,579 | B1 | | 10/2002 | Camilleri et al. |

* cited by examiner

Primary Examiner—Don Le
(74) Attorney, Agent, or Firm—Floyd A. Gonzalez; Cantor Colburn LLP (57) ABSTRACT

A communication system for establishing bidirectional, asynchronous communication between a first device and a second device. The system includes first asynchronous encoder logic and second asynchronous encoder logic for controlling the state of the communication system such that bi-directional communication is enabled without a direction control line.

8 Claims, 7 Drawing Sheets

| PRESENT STATE | | INPUTS | | NEXT STATE | |
| --- | --- | --- | --- | --- | --- |
| A | B | M | S | X | Y |
| 0 | 0 | 0 | 0 | 1 | 1 |
| 0 | 0 | 0 | 1 | 1 | 1 |
| 0 | 0 | 1 | 1 | 1 | 1 |
| 0 | 0 | 1 | 0 | 1 | 1 |
| 0 | 1 | 0 | 0 | 0 | 1 |
| 0 | 1 | 0 | 1 | 0 | 1 |
| 0 | 1 | 1 | 0 | 1 | 1 |
| 1 | 1 | 1 | 0 | 1 | 1 |
| 1 | 1 | 0 | 1 | 0 | 1 |
| 1 | 1 | 0 | 0 | 1 | 1 |
| 1 | 0 | 0 | 0 | 1 | 0 |
| 1 | 0 | 0 | 1 | 1 | 0 |
| 1 | 0 | 1 | 1 | 1 | 1 |
| 1 | 0 | 1 | 0 | 1 | 0 |

METHOD AND SYSTEM FOR PROVIDING BIDIRECTIONAL ASYNCHRONOUS COMMUNICATION

FIELD OF THE INVENTION

The present invention relates to communication and in particular to a method and system for providing bidirectional communication between two devices. Embodiments of the invention use a state machine design that may be implemented using discrete logic or programmable logic devices.

BACKGROUND OF THE INVENTION

Existing complex programmable logic devices (CPLD), field programmable gate array (FPGA), and application specific integrated circuit (ASIC) technologies do not directly support the implementation of internal bidirectional signals without the use of a dedicated direction control signal. Current architectures allow for I/O pins to be configured as bidirectional signals. However, these architectures do not allow for two of these pins to be directly tied together while maintaining a truly asynchronous bidirectional data path. The only existing solution to this unique problem is the introduction of a data direction control signal, which makes asynchronous bidirectional communication impossible.

A common method of implementing an asynchronous bidirectional half duplex communications link is the use of an open drain or open collector driver and a logic receiver at each end of the communications link which has a pull up resistor to a common voltage. It is possible for multiple devices to be connected to the same link. In the case of multiple devices on the same link, when one device talks, all other devices on the net receive the message. In this case an agreed means of addressing is used so that the intended recipient knows the message is for him. At times it is desirable or necessary to isolate certain devices on such a link. This can arise because multiple devices may share the same address or there may not be enough addresses to accommodate the number of devices. Alternately it may be desirable to isolate a failing device from the link so that the failing device does not render the link inoperative. Many other instances arise where it is desirable to be able to inexpensively route and manipulate such communications links. Typically open drain and open collector communication links can be isolated, switched and routed using analog switches. Analog switches are large and expensive and this limits the complexity of the switching which can be easily achieved. It is desirable to be able to switch and route such signals using logic gates which could reside on a CPLD, FPGA, ASIC or other highly integrated, inexpensive device.

SUMMARY OF THE INVENTION

An embodiment of the invention is a communication system for establishing bidirectional communication between a first device and a second device and a means of separating the bidirectional signal into two unidirectional push-pull signals which can be routed and switched using standard logic gates. The system includes a first asynchronous encoder logic for connection to a first input/output pin on the first device. The first asynchronous encoder logic receives a first signal, current first state, current second state and second signal and generates a next first state. A first gate receives the next first state and generates a second drive signal. The system includes a second bus driver for connection with a second input/output pin on the second device. The second drive signal controls a state of the second bus driver to control the state of a second signal at the second input/output pin. The system includes second asynchronous encoder logic for connection to the second input/output pin on the second device. The second asynchronous encoder logic receives the first signal, the current first state, the current second state and the second signal and generates a next second state. A second gate receives the next second state and generates a first drive signal. The system includes a first bus driver for connection with the first input/output pin on the first device. The first drive signal controls a state of the first bus driver to control the state of the first signal at the first input/output pin. Another embodiment of the invention is a method for establishing bidirectional communication. Another embodiment of this invention includes high level switching and routing functions such as multiplexors and demultiplexors.

DETAILED DESCRIPTION OF THE INVENTION

Figure 1:
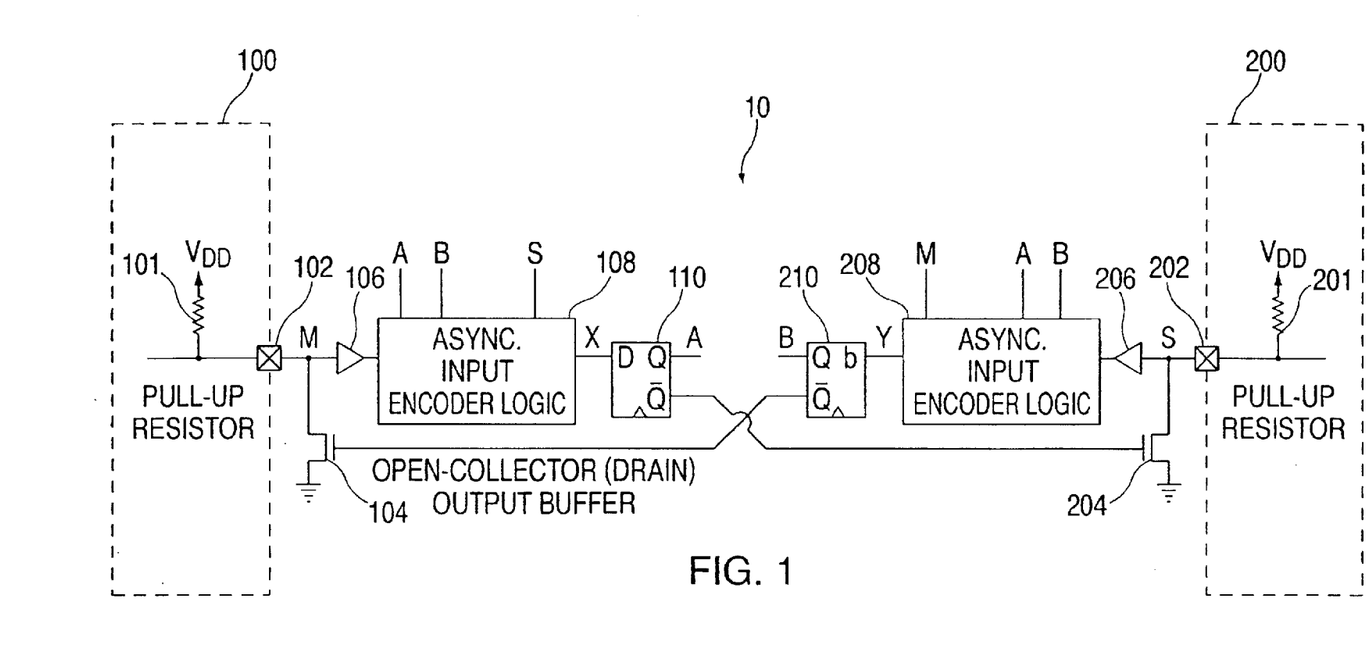
FIG. 1 depicts an exemplary bidirectional communication system between two devices.

FIG. 1 depicts an exemplary bidirectional communications system 10 between two devices, shown as first device 100 and second device 200. The designations first and second are for identification purposes only. The first and second designations do not indicate that one device has access priority to the communication bus or controls all communications between the two devices. Each device 100 and 200 includes a bidirectional input/output (I/O) pin 102 and 202, respectively. The input/output pins are pulled to logic high by pull-up resistors 101 and 201, respectively.

The communication system includes a first bus driver 104 and a second bus driver 204. The first signal M is provided to an input buffer 106 and then to first asynchronous encoder logic 108. The first asynchronous encoder logic 108 receives the first signal M, current first state A, current second state B and second signal S and generates a next first state X. The next first state X is provided to gate 110 (e.g., D flip flop) that outputs the next first state X as the current first state on the state machine clock. The current first state A is fed back as an input to the first asynchronous encoder logic 108 and second asynchronous encoder logic 208. Gate 110 also generates an inverted second drive signal which is provided to second bus driver 204. The second bus driver 204 connects the input/output pin 202 to ground and may be a switch element such as a BJT (i.e., in open collector configuration), FET (i.e., in open drain configuration), etc. The second drive signal activates second bus driver 204 that connects the input/output pin 202 to ground. As described in further detail herein, this corresponds to first device 100 sending a logic low to second device 200.

The second signal S is provided to an input buffer 206 and then to second asynchronous encoder logic 208. The second asynchronous encoder logic 208 receives the first signal M, current first state A, current second state B and second signal S and generates a next second state Y. The next second state Y is provided to gate 210 (e.g., D flip flop) that outputs the next second state Y as the current second state B on the state machine clock. Current second state B is fed back as an input to the first asynchronous encoder logic 108 and second asynchronous encoder logic 208. Gate 210 also generates an inverted first drive signal which is provided to first bus driver 104. The first bus driver 104 that connects the input/output pin 102 to ground and may be a switch element such as a BJT (i.e., in open collector configuration), FET (i.e., in open drain configuration), etc. The first drive signal activates first bus driver 104 connects the input/output pin 102 to ground. As described in further detail herein, this corresponds to second device 200 sending a logic low to first device 100.

Figure 2A:
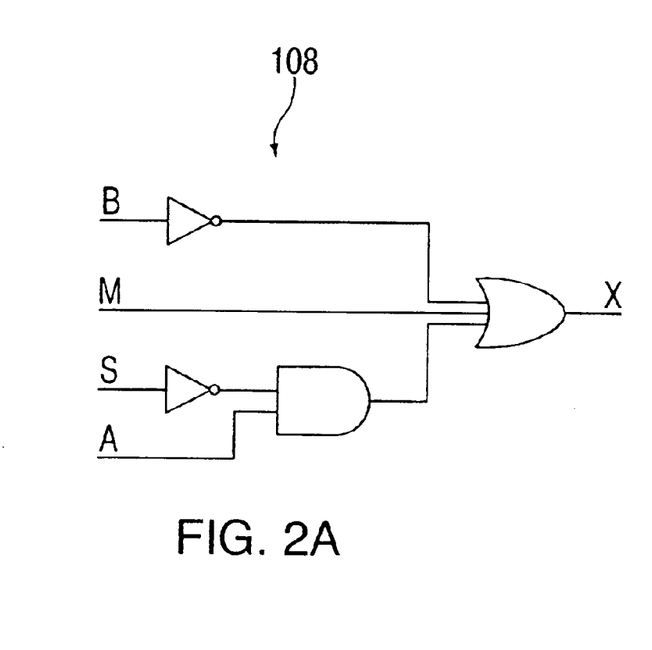
FIGS. 2A and 2B depict asynchronous encoder logic for first and second transceivers.
Figure 2B:
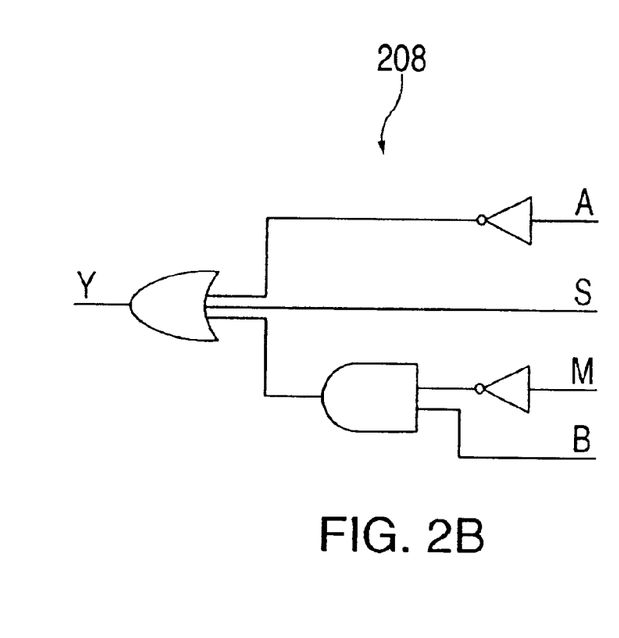

FIG. 2A depicts an exemplary embodiment for the first asynchronous encoder logic 108. The first asynchronous encoder logic 108 includes a number of logic gates that drive the next first state X. The various states and transitions are described in further detail with reference to FIG. 5. FIG. 2B depicts an exemplary embodiment for the second asynchronous encoder logic 208. The second asynchronous encoder logic 208 includes a number of logic gates that drive the next second state Y. The various states and transitions are described in further detail with reference to FIG. 5.

Figure 3:
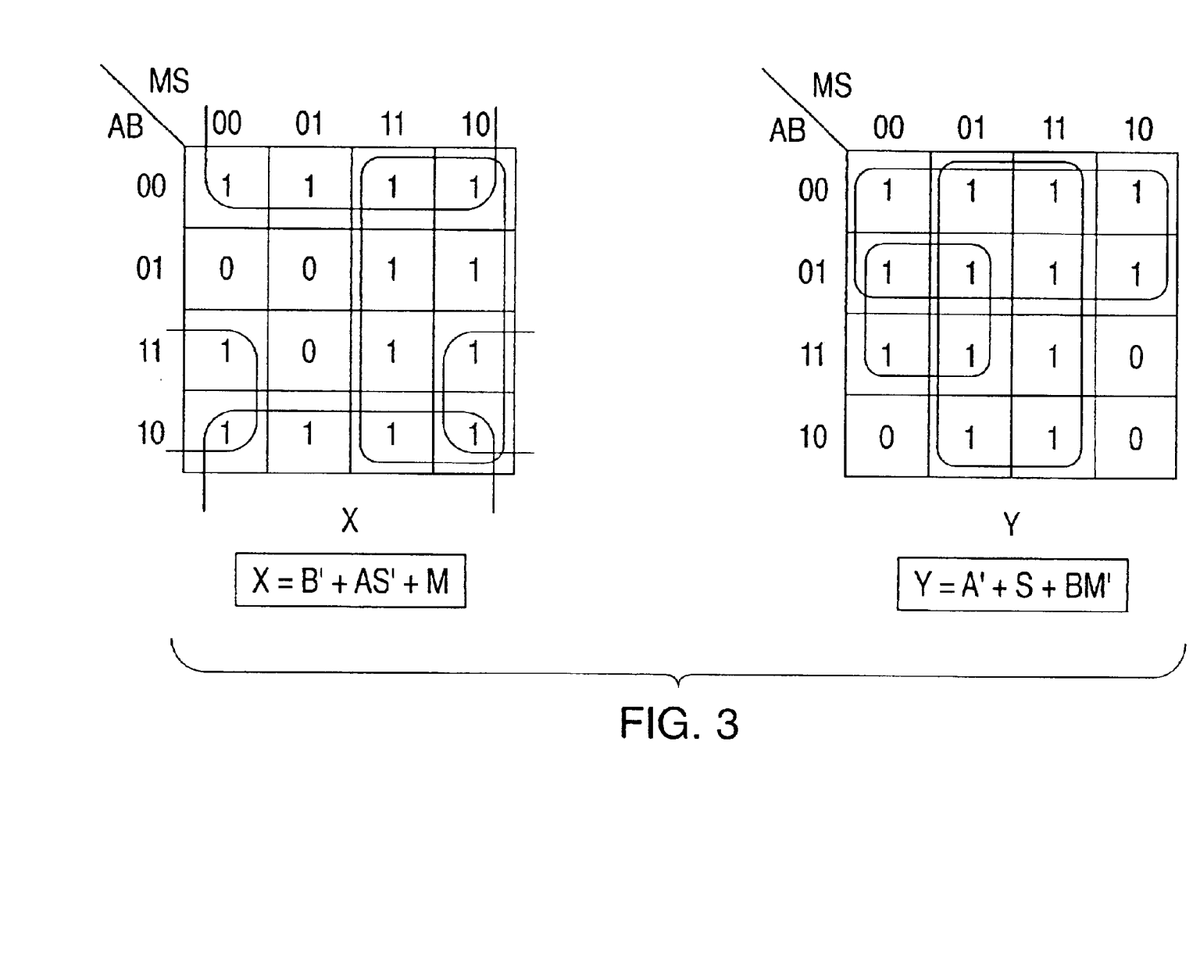
FIG. 3 depicts Karnaugh maps for the encoder logic.
Figure 4:
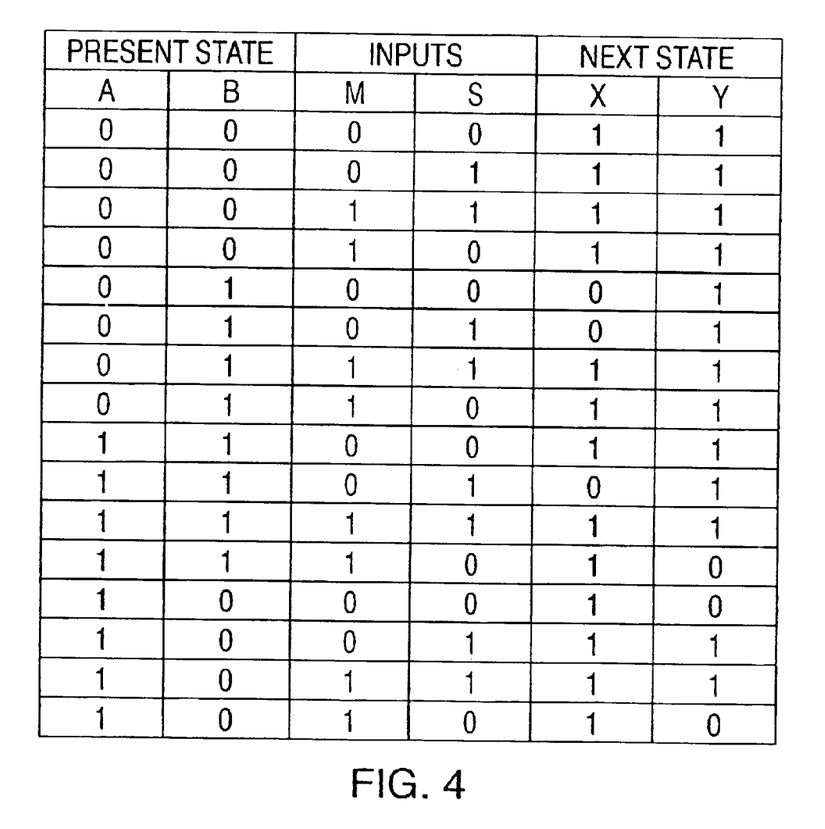
FIG. 4 depicts an exemplary state transition table for the communication system of FIG. 1.

FIG. 3 depicts Karnaugh maps used to develop the first encoder logic 108 and the second encoder logic 208. FIG. 4 depicts an exemplary state transition table for the communication system of FIG. 1.

In operation, either first device 100 or second device 200 desires to send data to the other device. To send data, the transmitting device drives input/output pin to a logic low which, when the system 10 is in the idle state, drives the input/output pin of the receiving device to a logic low. This initiates transmission of data from the transmitting device to the receiving device.

Figure 5:
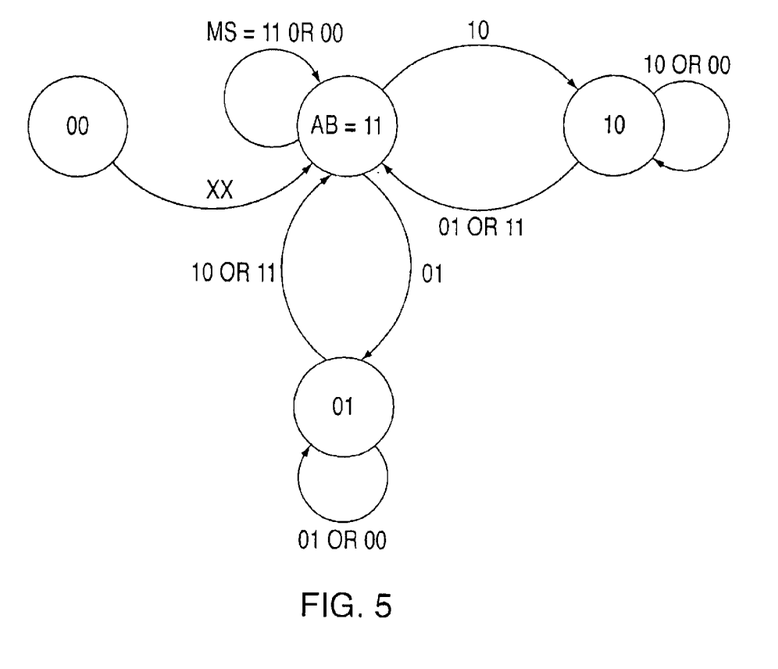
FIG. 5 depicts an exemplary state diagram for the communication system of FIG. 1.

FIG. 5 depicts an exemplary state diagram for the communication system 10 of FIG. 1. Upon initialization, the first state signal A and the second state signal B are both logic high and the state defaults to AB=11. This is the idle state and if first signal M and second signal S are both logic high (MS=11) this indicates that neither device is attempting to transmit to the other. If both first signal M and second signal S are logic low (MS=00), this indicates that both devices are attempting to transmit at the same time so the system 10 remains in the idle state. The MS=00 is considered a collision and collisions are not valid for half duplex open collector protocols.

If only the first device 100 is attempting to send data, the first device 100 drives the M signal to a logic low. The state transitions to AB=01 as shown in FIG. 5. Referring to FIG. 1, when in state AB=01, the value of not(A), the second drive signal for the second bus driver 204, is logic high thereby activating the second bus driver and pulling the second signal S to a logic low (ground). Also, the value of not(B), the first drive signal for the first bus driver 104, is logic low thereby deactivating the first bus driver 104 and it in a high impedance state, which allows for first device 100 to continue to pull second signal S to logic low. The system remains in state AB=OL and continues driving second signal S low until the first device 100 releases the bus, allowing the second signal to become a logic high.

To send a logic high from the first device 100 to the second device 200, the first device 100 releases the bus allowing the M signal to return to a logic high via pull up resistor 101. This results in the state transitioning to state AB=11 which in turn deactivates both bus drivers 104 and 204. The second signal S is no longer driven low, and returns to a logic high by virtue of pull up resistor 201. The first device 100 can continue sending logic low signals and logic high signals by driving the M signal as described above.

The second device 200 sends data to the first device 100 in a similar fashion. When the second device drives the S signal to a logic low, assuming the system state is AB=11, the system state transitions to state AB=10. The second device 200 sends logic low and logic high signals in a manner similar to that described above with reference to the first device 100. The second device 200 controls the first drive signals applied to first bus driver 104 to establish the value of the M signal.

Figure 6:
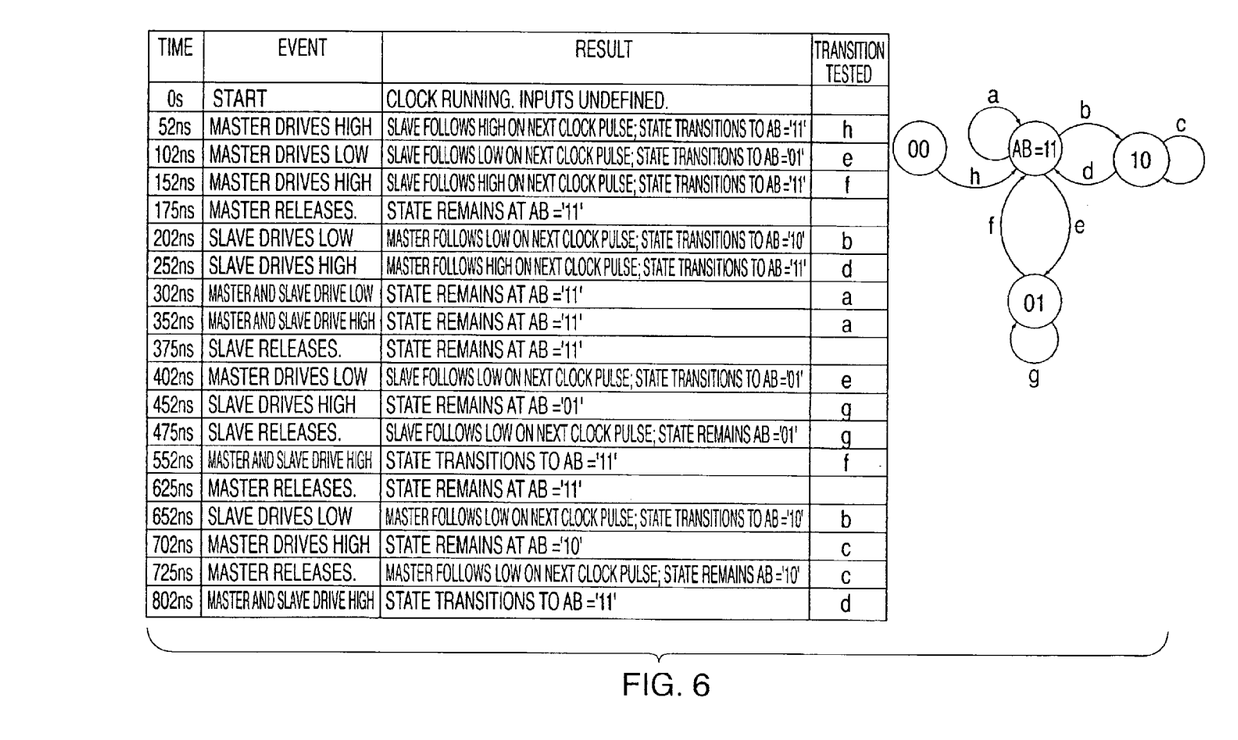
FIG. 6 depicts an exemplary sequence of events and corresponding state transitions.
Figure 7:
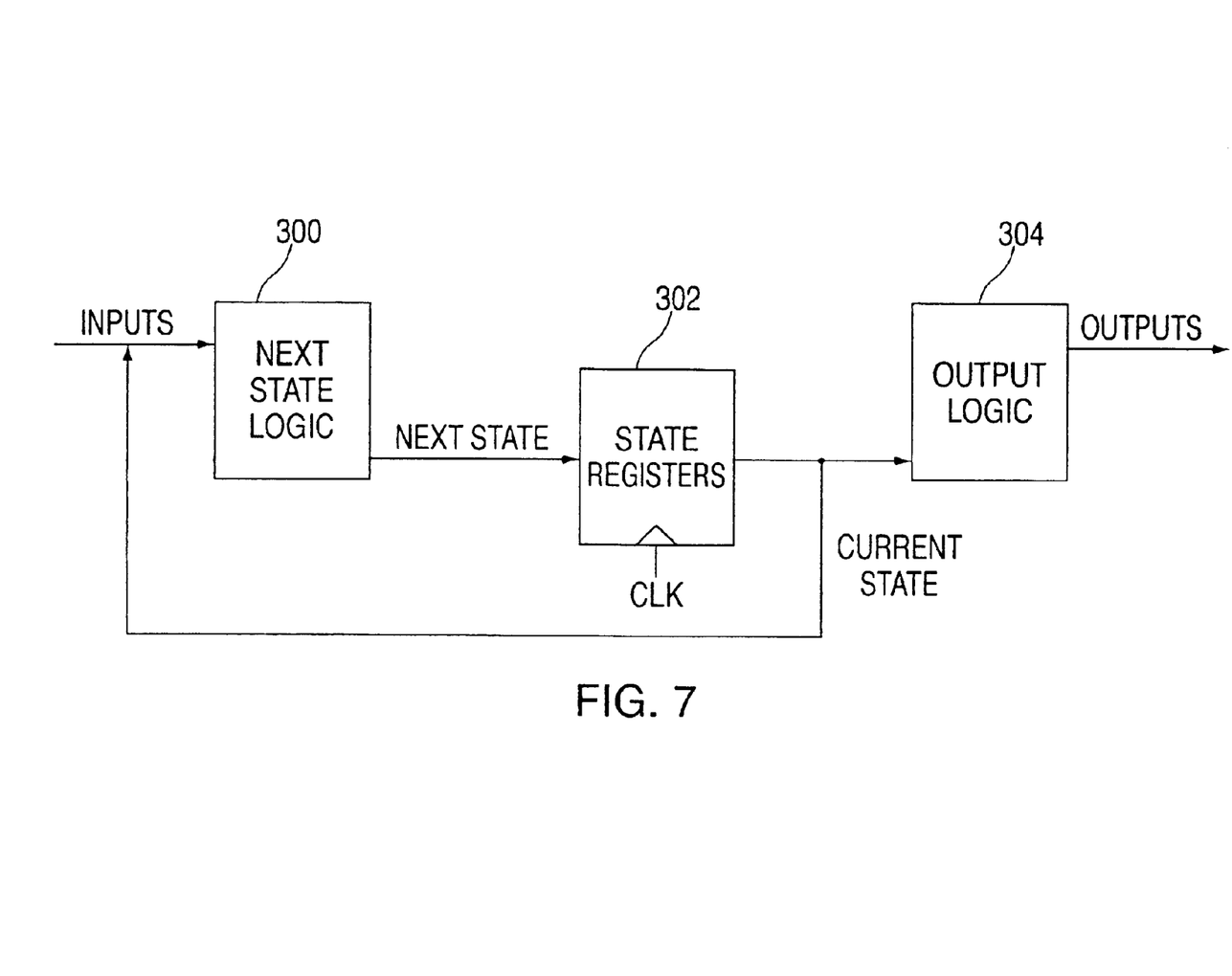
FIG. 7 is a high level block diagram of the state machine provided by the communication system of FIG. 1.

FIG. 6 shows a number of events and the corresponding changes in system state. As described above, either the first device 100 or the second device 200 initiates communication by driving the M signal or S signal, respectively, to a logic low. FIG. 7 is a high level block diagram of the communication system in an embodiment of the invention. As shown in FIG. 7, the current state is fed back as an input to the next state logic 300. This corresponds to the current first state A and current second state B being fed back to the first asynchronous encoder logic 108 and the second asynchronous encoder logic 208, respectively. [0011] State registers 302 latch the next state as the current state and correspond to gates 10 and 210. The output logic 304 uses the current state information to generate the appropriate outputs. This corresponds to the inverted output on gates 10 and 210. The state machine provided by the communication system 10 provides the current state as a feedback directly to the input of the next state logic 300. This is contrasted with a typical Moore state machine. The communication system 10 provides synchronous feedback directly to the inputs of the combinational logic.

Communication system 10 enables asynchronous, half duplex, bidirectional communication without the use of a directional control line. Communication system 10 is also transparent to the first device 100 and second device 206 and autonomously determines the direction of communication. The first device 100 and second-device 200 behave as if they are directly tied together by a copper wire. The communication system 10 may be implemented using individual logic elements, as part of an integrated circuit (such as a memory controller, serial communications multiplexor, or an interrupt arbitrator). The communication system 10 may also be as part of a larger system in a custom ASIC, FPGA, or CPLD. The communication system 10 provides a mechanism to separate the bidirectional signal into two unidirectional push-pull signals that can be routed and switched using standard logic gates. The system may also be used to create high level switching and routing functions such as multiplexors and demultiplexors.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A communication system for establishing bidirectional communication between a first device and a second device, the system comprising:

first asynchronous encoder logic for connection to a first input/output pin on the first device, said first asynchronous encoder logic receiving a first signal, current first state, current second state and second signal and generating a next first state;

a first gate receiving said next first state and generating a second drive signal;

a second bus driver for connection with a second input/output pin on the second device, said second drive signal controlling a state of said second bus driver to control the state of a second signal at said second input/output pin;

second asynchronous encoder logic for connection to said second input/output pin on the second device, said second asynchronous encoder logic receiving said first signal, said current first state, said current second state and said second signal and generating a next second state;

a second gate receiving said next second state and generating a first drive signal;

a first bus driver for connection with said first input/output pin on the first device, said first drive signal controlling a state of said first bus driver to control the state of said first signal at said first input/output pin.

2. The communication system of claim 1 wherein:

said first gate generates said current first state from said next first state, said current first state being fed back as an input to said first asynchronous encoder logic and said second asynchronous encoder logic.

3. The communication system of claim 1 wherein:

said second gate generates said current second state from said next second state, said current second state being fed back as an input to said first asynchronous encoder logic and said second asynchronous encoder logic.

4. The communication system of claim 1 wherein:

said second bus driver is a transistor having a terminal connected to ground and a terminal for connection to said second input/output pin.

5. The communication system of claim 1 wherein:

said first bus driver is a transistor having a terminal connected to ground and a terminal for connection to said first input/output pin.

6. The communication system of claim 1 wherein:

said first asynchronous encoder logic and said second asynchronous encoder logic control the state of the communication system such that only one of the first device and the second device transmits data at one time whereby the direction of communication is autonomously controlled by said first asynchronous encoder logic and said second asynchronous encoder logic.

7. A method for establishing bidirectional communication between a first device and a second device, the method comprising:

receiving a first signal, current first state, current second state and second signal and generating a next first state;

generating a second drive signal in response to said next first state;

controlling the state of a second signal at a second input/output pin in response to said second drive signal;

receiving said first signal, said current first state, said current second state and said second signal and generating a next second state;

generating a first drive signal in response to said next second state;

controlling the state of said first signal at a first input/output pin in response to said first drive signal.

8. The method of claim 7 wherein:

said controlling the state of said second signal and controlling the state of said first signal is performed such that only one of the first device and the second device transmits data at one time.

* * * * *